(12) United States Patent
 Zafeiropoulos

(10) Patent No.: US 10,810,991 B2
(45) Date of Patent: Oct. 20, 2020

(54) ACTIVE ROAD NOISE CONTROL

(71) Applicant: Harman Becker Automotive Systems GmbH, Karlsbad (DE)

(72) Inventor: Nikos Zafeiropoulos, Straubing (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 0 days.

(21) Appl. No.: 16/634,841

(22) PCT Filed: Aug. 1, 2017

(86) PCT No.: PCT/EP2017/069408
 § 371 (c)(1),
 (2) Date: Jan. 28, 2020

(87) PCT Pub. No.: WO2019/024985
 PCT Pub. Date: Feb. 7, 2019

(65) Prior Publication Data
 US 2020/0160827 A1    May 21, 2020

(51) Int. Cl.
 *G10K 11/178*    (2006.01)
 *B60N 2/879*    (2018.01)
 *G01P 15/08*    (2006.01)

(52) U.S. Cl.
 CPC ........ *G10K 11/17854* (2018.01); *B60N 2/879* (2018.02); *G01P 15/0802* (2013.01); *G10K 11/17857* (2018.01); *G10K 11/17883* (2018.01); *G10K 2210/1282* (2013.01); *G10K 2210/501* (2013.01)

(58) Field of Classification Search
 None
 See application file for complete search history.

(56) References Cited

U.S. PATENT DOCUMENTS

| | | | |
|---|---|---|---|
| 5,332,061 A * | 7/1994 | Majeed | B60K 5/1283 180/312 |
| 5,410,605 A | 4/1995 | Sawada et al. | |
| 5,526,292 A | 6/1996 | Hodgson et al. | |
| 2014/0270231 A1* | 9/2014 | Dusan | G10L 25/90 381/74 |

(Continued)

FOREIGN PATENT DOCUMENTS

| | | |
|---|---|---|
| EP | 2840568 A1 | 2/2015 |
| WO | 2014042243 A1 | 3/2014 |

(Continued)

OTHER PUBLICATIONS

WO 2014042243 english machine translation.*

(Continued)

*Primary Examiner* — James K Mooney
(74) *Attorney, Agent, or Firm* — McCoy Russell LLP

(57) ABSTRACT

An active road noise control system and method for a vehicle includes generating a microphone sense signal representative of road noise occurring in or at a wheel well of the vehicle, and iteratively and adaptively processing the microphone sense signal to provide a noise reducing signal. The system and method further include generating from the noise reducing signal with a headrest loudspeaker arrangement disposed in a headrest in an interior of the vehicle, noise reducing sound at a listening position in the interior of the vehicle.

13 Claims, 5 Drawing Sheets

(56) References Cited

U.S. PATENT DOCUMENTS

2016/0196817 A1 7/2016 Mortensen et al.
2016/0329040 A1 11/2016 Whinnery

FOREIGN PATENT DOCUMENTS

WO 2017025248 A1 2/2017
WO 2017157596 A1 9/2017

OTHER PUBLICATIONS

ISA European Patent Office, International Search Report and Written Opinion Issued in Application No. PCT/EP2017/069408, dated Apr. 25, 2018, WIPO, 14 pages.

* cited by examiner

ACTIVE ROAD NOISE CONTROL

CROSS REFERENCE TO RELATED APPLICATIONS

The present application is a national phase of International Application No. PCT/EP2017/069408 entitled "ACTIVE ROAD NOISE CONTROL", and filed on Aug. 1, 2017. The entire contents of the above-identified application is hereby incorporated by reference for all purposes.

FIELD

The disclosure relates to active road noise control systems and methods (generally referred to as "systems").

BACKGROUND

Land based vehicles, when driven on roads and other surfaces, generate noise known as road noise. Even in modern vehicles, cabin occupants may be exposed to road noise that is transmitted through the structure, e.g. tires-suspension-body-cabin path, and through airborne paths, e.g. tires-body-cabin path, to the cabin. Active noise, vibration, and harshness (NVH) control technologies, also known as active road noise control (RNC) systems, can be used to reduce these noise components without modifying the vehicle's structure as in active vibration technologies. However, active road noise control technologies may employ complex noise sensor arrangements throughout the vehicle structure in order to properly observe road noise related signals, particularly signals related to road noise originating from moving parts such as rolling wheels. It is desirable to reduce the road noise experienced by cabin occupants more efficiently.

SUMMARY

An active road noise control system for a vehicle includes a microphone arrangement configured to generate a microphone sense signal representative of road noise occurring in or at a wheel well of the vehicle, and an active road noise control filter arrangement configured to iteratively and adaptively process the microphone sense signal to provide a noise reducing signal. The system further includes a headrest loudspeaker arrangement disposed in a headrest in an interior of the vehicle and configured to generate, from the noise reducing signal, noise reducing sound at a listening position in the interior of the vehicle.

An active road noise control method for a vehicle includes generating a microphone sense signal representative of road noise occurring in or at a wheel well of the vehicle, and iteratively and adaptively processing the microphone sense signal to provide a noise reducing signal. The method further includes generating from the noise reducing signal with a headrest loudspeaker arrangement disposed in a headrest in an interior of the vehicle, noise reducing sound at a listening position in the interior of the vehicle.

Other systems, methods, features and advantages will be, or will become, apparent to one with skill in the art upon examination of the following detailed description and appended figures. It is intended that all such additional systems, methods, features and advantages be included within this description, be within the scope of the invention, and be protected by the following claims.

BRIEF DESCRIPTION OF THE DRAWINGS

The disclosure may be better understood by reading the following description of non-limiting embodiments to the attached drawings, in which like elements are referred to with like reference numbers, wherein below.

DETAILED DESCRIPTION

Noise and vibration sensors provide reference inputs to active road noise control (RNC) systems, which may include one or more feedforward active road noise control channels, as a basis for generating anti-noise that reduces or even cancels road noise. Noise and vibration sensors may include acceleration sensors such as accelerometers, force gauges, load cells, etc. For example, an accelerometer is a device that measures proper acceleration. Proper acceleration is not the same as coordinate acceleration, which is the rate of change of velocity. Single- and multi-axis models of accelerometers are available for detecting magnitude and direction of the proper acceleration, and can be used to sense orientation, coordinate acceleration, motion, vibration, and shock.

Airborne and structure-borne noise sources are monitored by the noise and vibration sensors, in order to provide the highest possible road noise reduction performance between 0 Hz and 1 kHz. For example, acceleration sensors used as input noise and vibration sensors may be disposed across the vehicle to monitor the structural behavior of the suspension and other axle components of a vehicle for global road noise control. Above a frequency of 500 Hz or more, acoustic sensors such as noise sensing microphones may be employed to pick up the airborne road noise and generating one or more corresponding reference input signals for road noise control.

Further, one or more error microphones may be placed in close proximity of the passenger's ears, as for example in a headrest of a seat in an interior of the vehicle, to provide additionally an error signal or error signals for road noise control. An active road noise control filter arrangement, which may include noise cancelation filters employed in a feedforward structure, may iteratively and adaptively process the one or more reference input signals dependent on the error signal to provide a noise reducing signal to a system loudspeaker arrangement which includes one or more loudspeakers disposed in body elements of the vehicle such as a door, trunk, dash board, roof etc. The noise cancelation filters may be iteratively and adaptively tuned to achieve maximum noise reduction.

It has been found that, alternatively or additionally, picking up road noise occurring in or at one or more wheel wells of the vehicle with one or more acoustic sensors such as microphones, and radiating noise reducing sound, which has been generated based on the sound picked up in or at the one or more wheel wells, with one or more loudspeakers disposed in the headrest can significantly enhance the performance of common active road noise control systems and methods.

Figure 1:
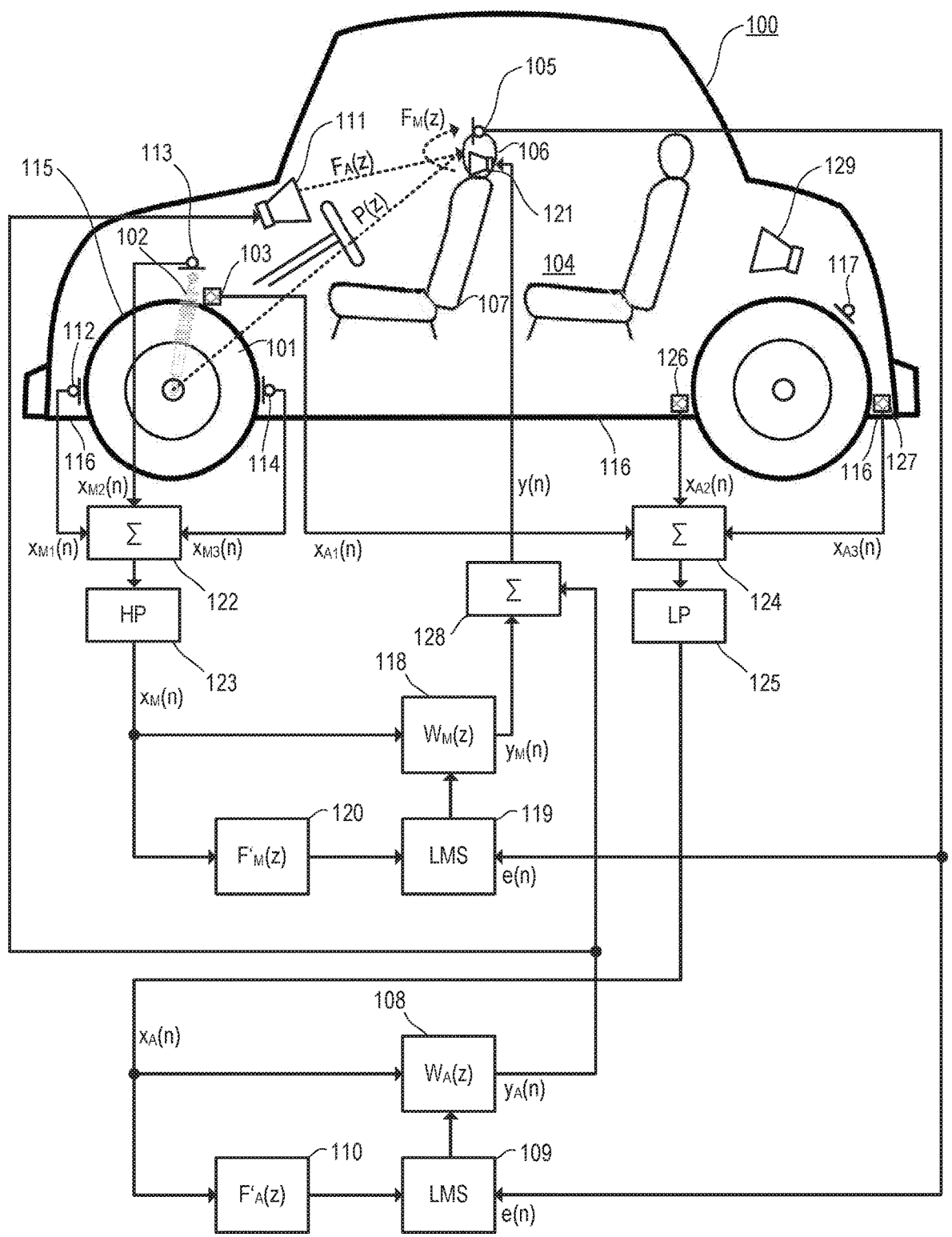
FIG. 1 is a schematic diagram illustrating an exemplary multi-channel active road noise control system utilizing noise sensing microphones at specific positions.

A dual-channel feedforward active road noise control system may be implemented as shown in FIG. 1. Vibrations that originate from a wheel 101 of a vehicle 100 moving on a road surface (not shown) are detected by an acceleration sensor, e.g., an accelerometer 103 which may mechanically be coupled with a suspension device 102 (e.g., bumper, spring, bumper suspension, spring suspension, etc.) of the automotive vehicle 100 and which outputs an accelerometer sense signal $x_{A1}(n)$ that represents detected vibrations and, thus, correlates with road noise audible in an interior 104 of the vehicle 100. Further, an error signal e(n) representing noise present in the interior 104 of the vehicle 100 is detected by an acoustic sensor, e.g., an error microphone 105, arranged in a headrest 106 of a seat 107 (e.g., driver's seat) in the interior 104. The seat 107, particularly its headrest 106, defines a listening position in the interior 104. Road noise originating from the wheel 101 is (partly) mechanically via the vehicle body and/or (partly) acoustically via air transferred to the error microphone 105 via a (primary) path according to a transfer characteristic P(z).

A transfer characteristic $W_A(z)$ of a controllable filter 108 is controlled by an adaptive filter controller 109 which may operate according to the known least mean square (LMS) algorithm based on the error signal e(n) and on an accelerometer sense signal $x_A(n)$ filtered with a transfer characteristic $F'_A(z)$ by an optional filter 110, wherein $W_A(z)=-P(z)/F'_A(z)$. The transfer function $F'_A(z)$ models (i.e., is ideally equal to or at least approximates) a transfer function $F_A(z)$ which represents the transfer characteristics of a (secondary) path between a system loudspeaker arrangement 111 and the error microphone 105. The system loudspeaker arrangement 111 includes one or more loudspeakers disposed in body elements of the vehicle 100.

A noise reduction signal $y_A(n)$ that inversely corresponds to the road noise audible at the listening position in the interior 104 is generated, based on the identified transfer characteristic $W_A(z)$ and the accelerometer sense signal $x_{A1}(n)$, by an active road noise control filter arrangement that includes at least the controllable filter 108 and filter controller 109. Sound that is ideally inverse to the road noise audible at the listening position is generated from the noise reduction signal $y_A(n)$, and is radiated by the system loudspeaker arrangement 111 to be destructively superimposed with the road noise at the listening position.

Further, the noise originating from the wheel 101 is also picked up by a noise sensing microphone arrangement which may include one or more microphones, for example, three noise sensing microphones 112, 113, and 114, which are disposed somewhere in or at (e.g., around) a wheel well 115 of the vehicle 100. The three noise sensing microphones 112, 113, and 114 output microphone sense signals xM1(n), xM2(n) and xM3(n) which represent picked-up noise and, thus, correlate also with road noise audible in the interior 104 of the vehicle 100. For example, microphone 113 may be disposed close to the suspension device 102, and microphones 112 and 114 may be disposed on opposite sides of the wheel well 115 and close to a floor panel 116 of the vehicle 100. Alternatively or additionally, a noise sensing microphone 117 may be disposed in a trunk or the like of the vehicle 100 close to the wheel well 115 or another wheel well or in an area between the trunk and the wheel well.

A transfer characteristic $W_M(z)$ of a controllable filter 118 is controlled by an adaptive filter controller 119 which may operate according to the known least mean square (LMS) algorithm based on the error signal e(n) and on an accelerometer sense signal $x_a(n)$ filtered with a transfer characteristic $F'_M(z)$ by an optional filter 120, wherein $W_M(z)=-P(z)/F'_M(z)$. The transfer function $F'_M(z)$ models (i.e., is ideally equal to or at least approximates) a transfer function $F_M(z)$ which represents the transfer characteristics of a (secondary) path between a loudspeaker arrangement 121 and the error microphone 105. The loudspeaker arrangement 121 includes one or more loudspeakers disposed in the headrest 106.

A noise reduction signal $y_M(n)$ that inversely corresponds to the road noise audible at the listening position in the interior 104 is generated, based on the identified transfer characteristic $W_M(z)$ and a microphone sense signal $x_M(n)$, by an active road noise control filter arrangement that includes at least the controllable filter 118 and filter controller 119. Sound that is ideally inverse to the road noise audible at the listening position is then generated from the noise reduction signal $y_M(n)$ and radiated by the loudspeaker arrangement 120 to be destructively superimposed with the road noise at the listening position.

The microphone sense signal xM(n) may be derived from one of the microphone sense signals xM1(n), xM2(n), and xM3(n), or any combination thereof as shown in FIG. 1 where all microphone sense signals xM1(n), xM1(n), and xM3(n) are combined, e.g., summed up by a summer 122. The signal resulting from the microphone sense signals xM1(n), xM2(n), and xM3(n) may be highpass filtered by a highpass filter 123 to provide microphone sense signal xM(n).

Similarly, the accelerometer sense signal xA(n) may be derived from the accelerometer sense signal xA1(n), or one of accelerometer sense signals xA2(n) and xA3(n), or any combination thereof as shown in FIG. 1 where all accelerometer sense signals xA1(n), xA1(n), and xA3(n) are combined, e.g., summed up by a summer 124. The signal resulting from accelerometer sense signals xA1(n), xA1(n), and xA3(n) may be lowpass filtered by a lowpass filter 125 to provide microphone sense signal xA(n). The accelerometer sense signals xA2(n) and xA3(n) may be provided by accelerometers 126 and 127 which may be disposed in or on body parts of the vehicle 100 such as on opposite sides of any wheel well and close to the floor panel 116 of the vehicle 100.

The noise control structure utilizing microphones for sensing road noise, which includes at least controllable filter 118 and filter controller 119, may be operated independently, or in combination with the noise control structure utilizing accelerometers to sense road noise, which includes at least controllable filter 108 and filter controller 109. When used in combination, the noise control structure utilizing microphones may operate solely with loudspeaker arrangement 121 and the noise control structure utilizing accelerometers may operate solely with system loudspeaker arrangement 111. However, as shown in FIG. 1, the control structure utilizing accelerometers may operate with both the system loudspeaker arrangement 111 and the headrest loudspeaker arrangement 121. To this end, a summer 128 sums up noise reduction signals $y_A(n)$ and $y_M(n)$ and supplies a sum signal to loudspeaker arrangement 121 while system loudspeaker arrangement 111 is solely supplied with the noise reduction signal $y_A(n)$.

The highpass filter 123 and the lowpass filter 125 may have identical or similar cut-off frequencies so that they may form a splitter filter arrangement. The splitter filter arrangement divides a frequency range in a lower sub-range below a mutual splitting frequency and a higher sub-range above the splitting frequency, wherein the lower sub-range is used for filtering accelerometer sense signals and the higher sub-range is used for filtering microphone sense signals. The splitting frequency may be somewhere between 100 Hz and 1000 Hz, e.g., at 500 Hz.

Further, if optional filters 110, 120 are employed as shown in FIG. 1, a dual-channel feedforward filtered-x LMS control structure is implemented, but other control structures, e.g., any single-channel structures or any other multi-channel structures with additional channels, additional accelerometers, additional microphones, and additional loudspeakers, may be applied as well as described below in connection with FIG. 2.

Figure 2:
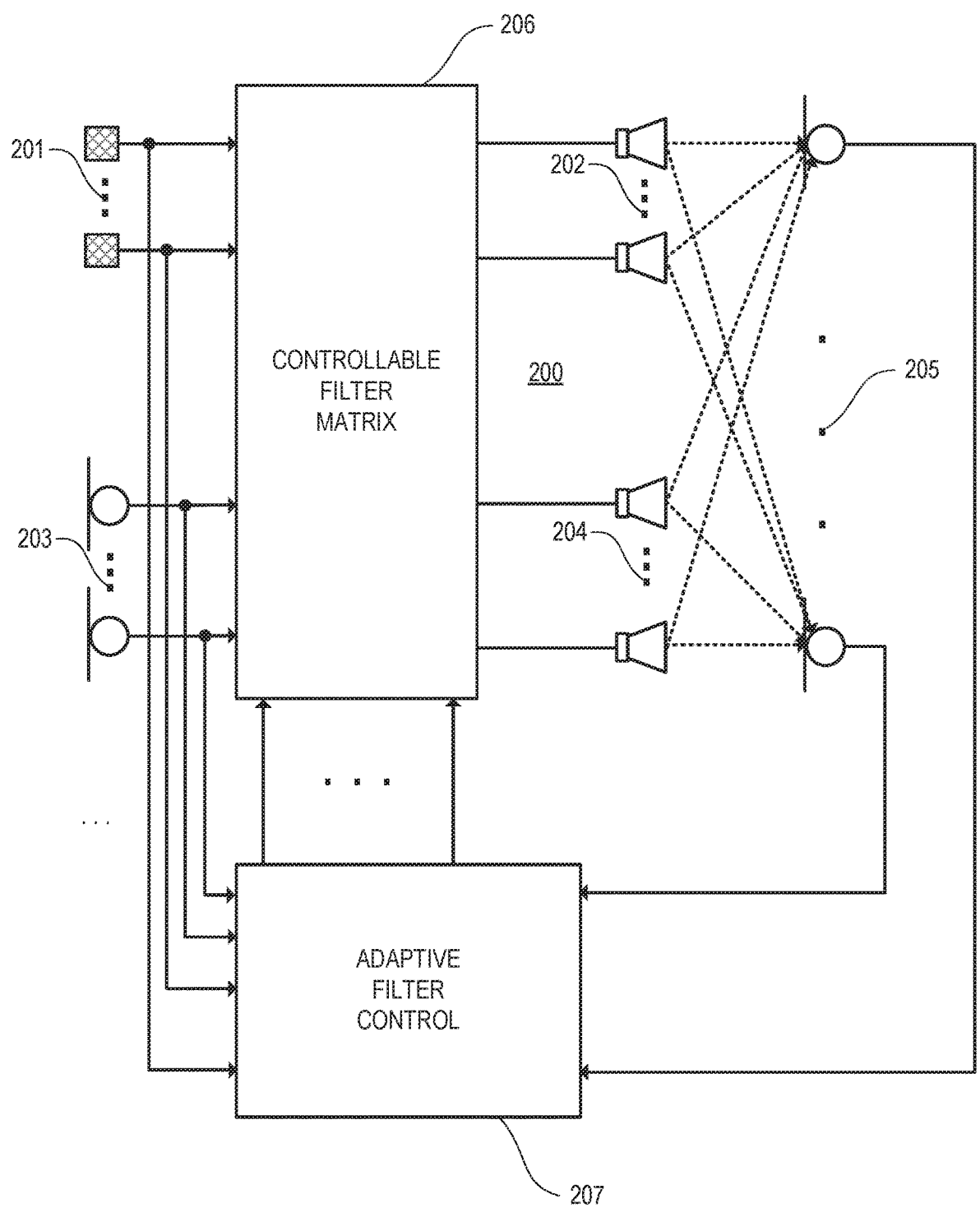
FIG. 2 is a schematic diagram illustrating another exemplary multi-channel active road noise control system.

FIG. 2 illustrates a multi-channel active road noise control system 200 capable of suppressing noise from a plurality of noise (and vibration) sources. The active road noise control system 200 comprises a first number (≥1) of accelerometers 201, a second number (≥1) of headrest loudspeakers 202, a third number (≥1) of noise sensing microphones 203, a fourth number (≥1) of system loudspeakers 204, a fifth number of error microphones 205, a (multi-channel) controllable filter matrix 206 and a (multi-channel) adaptive filter control 207 which operates to minimize the error between noise from the accelerometers (primary noise) and noise cancelling sound (secondary noise) from the loudspeakers 202 and 204. The adaptive filter control 207 may include a corresponding number of road noise control channels (not shown), provided for each of the loudspeakers 202 and 204 or groups thereof, which generate cancelling signals for reducing noise picked up by related noise sensing microphones or groups thereof, and optional accelerometers or groups thereof.

In conventional active road noise control systems, the frequency range of noise to be reduced may be limited to a low frequency range. Further, adaptive digital filters employed in these systems may only be able to reduce low frequency noise components, although processing over a wide frequency range is desired. In the active road noise control systems described herein, careful positioning of the acoustic sensors and optional accelerometers allows for a better noise reduction performance and a broader operating frequency range.

Figure 3:
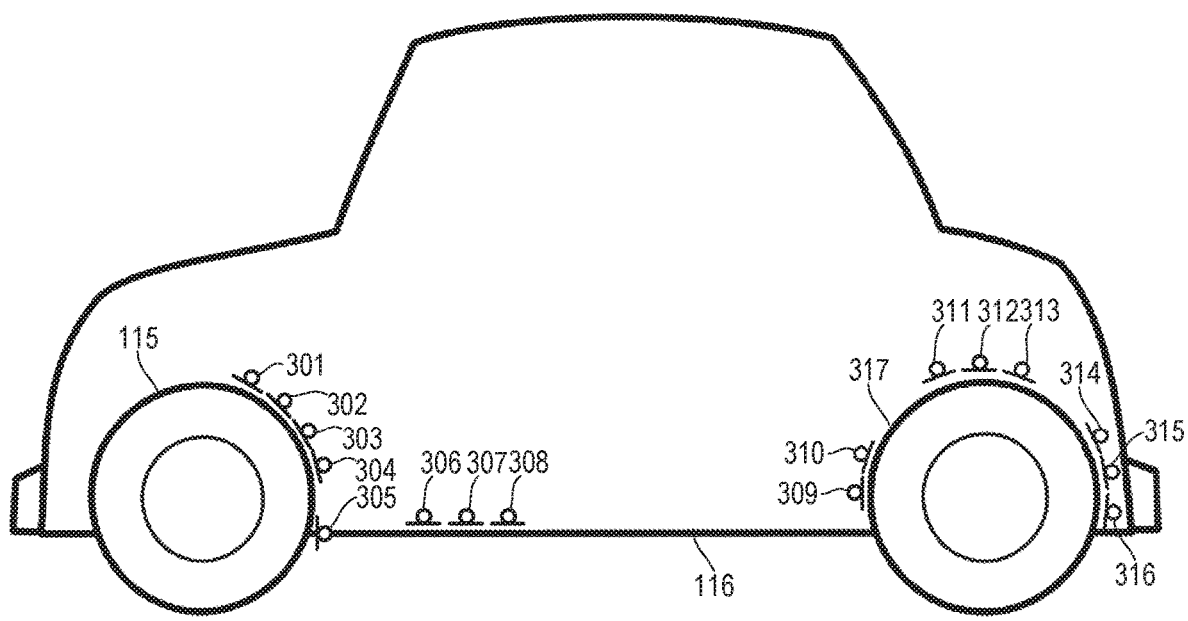
FIG. 3 is a schematic diagram illustrating alternative or additional positions for placing noise sensing microphones.

Alternative or additional positions for disposing noise sensing microphones may be employed as illustrated in FIG. 3. For example, a number of (e.g., five) microphones 301-305 may be disposed around the rear part of at least one front wheel well 115, wherein microphone 305 may be disposed close to, in or at the floor panel 116. Optionally, a number of (e.g., three) noise sensing microphones 306-308 may be positioned between the front wheel well 115 and a rear wheel well 317, closer to the front wheel well 115, and close to, in or at the floor panel 116. Alternatively or additionally, microphones 309-316 may be disposed around a rear wheel in or at a rear wheel well 317. For example, the positions of microphones 309 and 310 may be in front of the rear wheel and the positions of microphones 309 and 310 may be, side by side, in front of the rear wheel. The positions of microphones 314 and 315 may be, side by side, behind the rear wheel. The positions of microphones 311 may be, side by side, on top of the wheel.

Figure 4:
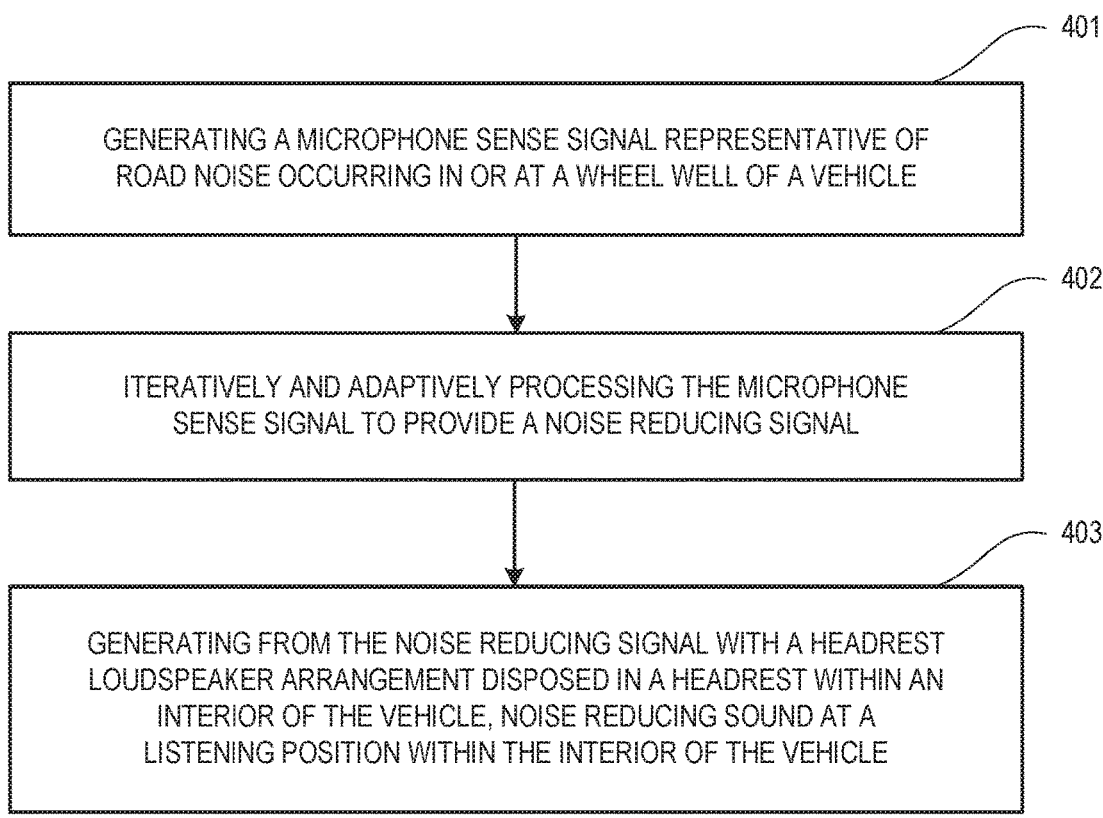
FIG. 4 is a flow chart of an exemplary active road noise control method.

Referring to FIG. 4, an exemplary method as can be implemented in the systems described above in connection with FIG. 1 may include generating a microphone sense signal representative of road noise occurring in or at a wheel well of the vehicle (401), and iteratively and adaptively processing the microphone sense signal to provide a noise reducing signal (402). The method further includes generating from the noise reducing signal with a headrest loudspeaker arrangement disposed in a headrest of a seat in an interior of a vehicle, noise reducing sound at a listening position (e.g., at the seat) in the interior of the vehicle (403).

Figure 5:
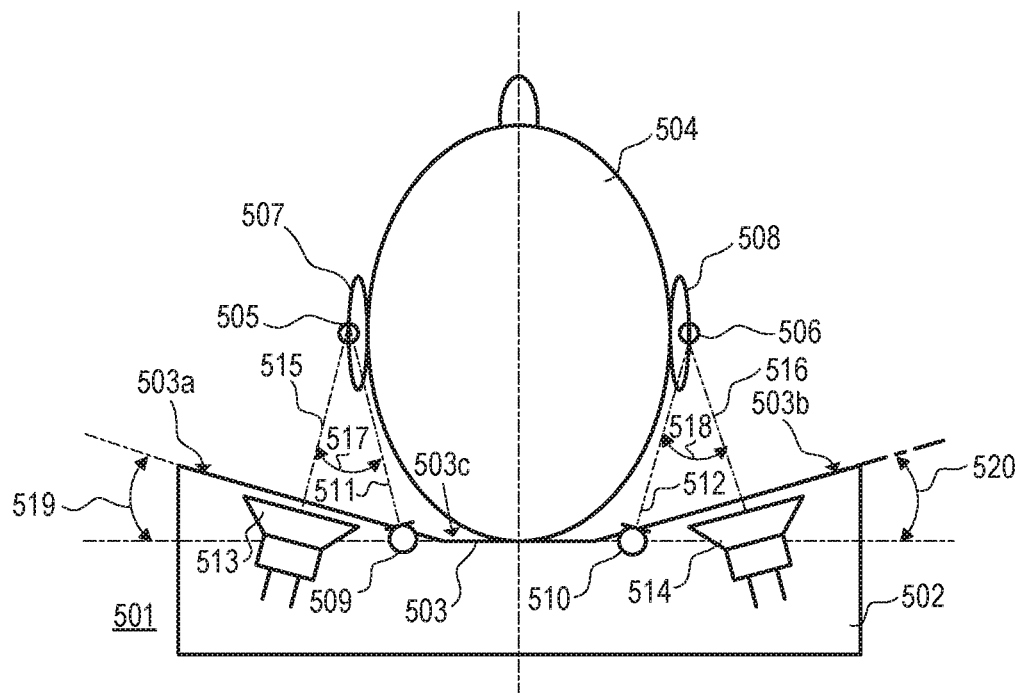
FIG. 5 is a schematic diagram of an exemplary headrest in which microphones and loudspeakers are integrated side by side in a front surface of the headrest, the microphones being arranged towards a center of the headrest and the loudspeakers being arranged towards a periphery of the headrest.

Reference is now made to FIG. 5, which depicts an exemplary headrest 501 in a sectional illustration. Headrest 501 may have a cover and one or more structural elements that form a headrest body 502. Headrest 501 may comprise a pair of support pillars (not shown) that engage the top of a vehicle seat (not shown) and may be movable up and down by way of a mechanism integrated in the seat. Headrest body 502 has front surface 503 that supports a user's head 504, thereby defining preferential positions 505 and 506 of user's ears 507 and 508. Preferential positions are where the respective ear is at or close to this particular position most of the time (>50%) during intended use, and may form desired listening positions at which, for example, quiet zones are to be established.

Two unidirectional (error) microphones 509 and 510, i.e., microphones that have a maximum sensitivity to sounds from principal receiving directions 511 and 512, are integrated in front surface 503 of headrest body 502, whereby principal receiving directions 511 and 512 intersect with one of preferential positions 505 and 506 of a passenger's ears 507 and 508, respectively. Headrest 501 further includes two loudspeakers 513 and 514 integrated in the headrest body 502. Loudspeakers 513 and 514 each have principal transmitting directions 515, 516 into which they radiate maximum sound energy. Headrest 501 has at its surface 503 an inward-curving (concave) shape with two planar end sections 503a, 503b and a planar intermediate section 503c in which the end sections are folded inwards by angles 519 and 520, respectively, of about 30 degrees, but any other angle between 10 and 50 degrees is applicable as well. In each of the end sections, one of microphones 509 and 510 and one of loudspeakers 513 and 514 are positioned. In headrest 501 shown in FIG. 5, loudspeakers 513 and 514 are arranged closer to the outer periphery of the surface 503 than microphones 509 and 510. Loudspeakers 513 and 514 are arranged such that their principal transmitting directions 515 and 516 each have one of angles 517 and 518 at preferential positions 505 and 506 of greater than 20 degree, e.g., 30 degrees with regard to the respective principal receiving directions of microphones 509 and 510.

Figure 6:
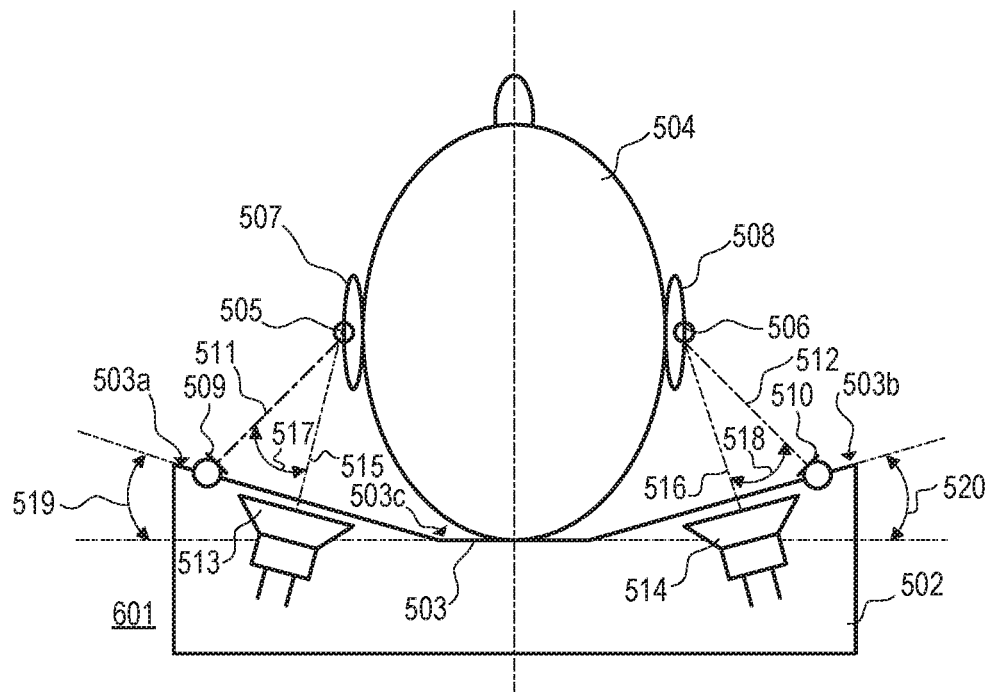
FIG. 6 is a schematic diagram of an exemplary headrest in which microphones and loudspeakers are integrated side by side in a front surface of the headrest, the microphones being arranged towards a periphery of the headrest and the loudspeakers being arranged towards a center of the headrest.

An exemplary headrest 601 shown in FIG. 6 is similar to headrest 501 shown in FIG. 5, however, the microphone positions and loudspeaker positions have been reversed and all positions have been shifted towards the outer peripheries of planar end sections 503a and 503b of front surface 503. Loudspeakers 513 and 514 are arranged such that their principal transmitting directions 515 and 516 have angles 517 and 518 at preferential positions 505 and 506 of greater than 30 degrees with regard to the respective principal receiving direction of microphones 509 and 510.

Figure 7:
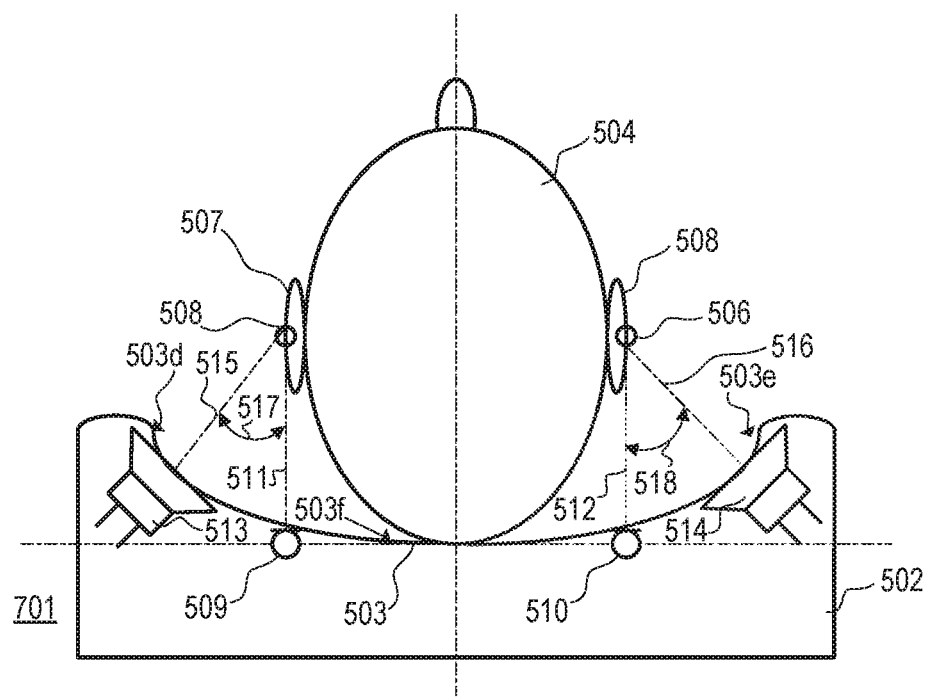
FIG. 7 is a schematic diagram of an exemplary headrest in which microphones and loudspeakers are integrated in a concave-shaped rounded front surface of the headrest, the microphones being arranged towards a center of the headrest and the loudspeakers being arranged towards a periphery of the headrest and elevated with regard to the microphones.

An exemplary headrest 701 shown in FIG. 7 is similar to headrest 501 shown in FIG. 5, however, front surface 503 of the headrest 701 has an inward-curving, rounded shape extending much further around the longitudinal axis of head 504, and it has curved end sections 503d and 503e and a curved intermediate section 503f. Loudspeakers 513 and 514 are arranged in peripheral sections 503d and 503e of headrest 501 and thus have a more laterally protruding level from intermediate section 503f of surface 503 than in the previous examples. Microphones 509 and 510 are positioned almost directly behind user's ears 507 and 508. Accordingly, loudspeakers 513 and 514 are arranged such that their principal transmitting directions 515 and 516 have angles 517 and 518 at preferential positions 505 and 506 of greater than 45 degrees with regard to the respective principal receiving direction of microphones 509 and 510.

Figure 8:
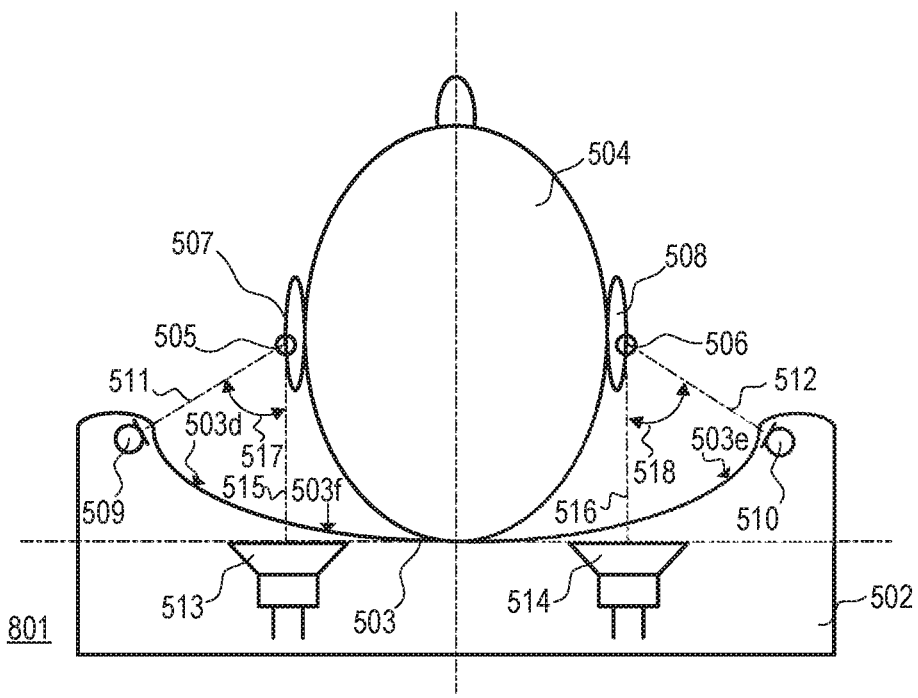
FIG. 8 is a schematic diagram of an exemplary headrest in which microphones and loudspeakers are integrated in a concave-shaped rounded front surface of the headrest, the loudspeakers being arranged towards a center of the headrest and the microphones being arranged towards a periphery of the headrest and elevated with regard to the loudspeakers.

Headrest 801 shown in FIG. 8 is similar to headrest 501 shown in FIG. 7, however, the microphone positions and loudspeaker positions are reversed and the positions of the microphones have been shifted towards the outer peripheries of curved end sections 503d and 503e of front surface 503. In the examples shown in FIGS. 5 to 8, two quiet zones are established around the preferential positions 505 and 506.

The description of embodiments has been presented for purposes of illustration and description. Suitable modifications and variations to the embodiments may be performed in light of the above description or may be acquired by practicing the methods. For example, unless otherwise noted, one or more of the described methods may be performed by a suitable device and/or combination of devices. The described associated actions may also be performed in various orders in addition to the order described in this application, in parallel, and/or simultaneously. The described systems are exemplary in nature, and may include additional elements and/or omit elements.

As used in this application, an element or step recited in the singular and preceded by the word "a" or "an" should be understood as not excluding the plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects.

The embodiments of the present disclosure generally provide for a plurality of circuits, electrical devices, and/or at least one controller. All references to the circuits, the at least one controller, and other electrical devices and the functionality provided by each, are not intended to be limited to encompassing only what is illustrated and described herein. While particular labels may be assigned to the various circuit(s), controller(s) and other electrical devices disclosed, such labels are not intended to limit the scope of operation for the various circuit(s), controller(s) and other electrical devices. Such circuit(s), controller(s) and other electrical devices may be combined with each other and/or separated in any manner based on the particular type of electrical implementation that is desired.

It is recognized that any system as disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any system as disclosed may utilize any one or more microprocessors to execute a computer-program that is embodied in a non-transitory computer readable medium that is programmed to perform any number of the functions as disclosed. Further, any controller as provided herein includes a housing and a various number of microprocessors, integrated circuits, and memory devices, (e.g., FLASH, random access memory (RAM), read only memory (ROM), electrically programmable read only memory (EPROM), and/or electrically erasable programmable read only memory (EEPROM).

While various embodiments of the invention have been described, it will be apparent to those of ordinary skilled in the art that many more embodiments and implementations are possible within the scope of the invention. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof.

The invention claimed is:

1. An active road noise control system for a vehicle, the system comprising:
 a microphone arrangement configured to generate a microphone sense signal representative of road noise occurring in or at a wheel well of the vehicle;
 an active road noise control filter configured to iteratively and adaptively process the microphone sense signal to provide a noise reducing signal;
 a headrest loudspeaker arrangement disposed in a headrest in an interior of the vehicle and configured to generate, from the noise reducing signal, noise reducing sound at a listening position in the interior of the vehicle; and
 an accelerometer arrangement configured to generate an accelerometer sense signal representative of at least one of accelerations, motions, and vibrations that occur on or in a body part of the vehicle, wherein the active road noise control filter is further configured to iteratively and adaptively process the microphone sense signal and the accelerometer sense signal to provide an additional noise reducing signal to the headrest loudspeaker arrangement.

2. The system of claim 1, further comprising an additional loudspeaker arrangement disposed outside the headrest and within the vehicle, and configured to generate, from the additional noise reducing signal, additional noise reducing sound at the listening position.

3. The system of claim 1, further comprising:
 a highpass filter operatively connected between the microphone arrangement and the active road noise control filter, the highpass filter arrangement being configured to highpass filter the microphone sense signal and
 a lowpass filter operatively connected between the accelerometer arrangement and the active road noise control filter, the accelerometer arrangement being configured to lowpass filter the accelerometer sense signal.

4. The system of claim 1, wherein the microphone arrangement comprises one or more microphones disposed in at least one of a wheel arch, a bumper and a trunk.

5. The system of claim 1, further comprising a feedforward processing structure, the feedforward processing structure including the active road noise control filter and configured to be supplied with the microphone sense signal from the microphone arrangement.

6. The system of claim 5, further comprising an error signal processing structure, wherein the error signal processing structure includes the active road noise control filter and is configured to be supplied with an error signal from an additional microphone arrangement disposed in or on the headrest.

7. An active road noise control method for a vehicle, the method comprising:
   generating a microphone sense signal representative of road noise occurring in or at a wheel well of the vehicle;
   iteratively and adaptively processing the microphone sense signal to provide a noise reducing signal;
   generating from the noise reducing signal with a headrest loudspeaker arrangement disposed in a headrest in an interior of the vehicle, noise reducing sound at a listening position in the interior of the vehicle;
   generating, with an accelerometer arrangement, an accelerometer sense signal representative of at least one of accelerations, motions, and vibrations that occur on or in a body part of the vehicle; and
   iteratively and adaptively processing the microphone sense signal and the accelerometer sense signal to provide an additional noise reducing signal to the headrest loudspeaker arrangement.

8. The method of claim 7, further comprising generating, from the additional noise reducing signal and with an additional loudspeaker arrangement disposed outside the headrest and in the vehicle, additional noise reducing sound at the listening position.

9. The method of claim 7, further comprising highpass filtering of the microphone sense signal and lowpass filtering of the accelerometer sense signal.

10. The method of claim 7, wherein generating a microphone sense signal comprises picking up noise with one or more microphones disposed in at least one of wheel arch, bumper and trunk.

11. The method of claim 7, wherein iteratively and adaptively processing the microphone sense signal comprises a feedforward processing structure, the feedforward structure being supplied with the microphone sense signal from the microphone arrangement.

12. The method of claim 11, wherein iteratively and adaptively processing the microphone sense signal comprises an error signal processing structure, the error signal structure being supplied with an error signal from an additional microphone arrangement disposed in or on the headrest.

13. A vehicle comprising an active road noise control system, wherein the active road noise control system comprises:
   a microphone arrangement configured to generate a microphone sense signal representative of road noise occurring in or at a wheel well of the vehicle;
   an active road noise control filter configured to iteratively and adaptively process the microphone sense signal to provide a noise reducing signal;
   a headrest loudspeaker arrangement disposed in a headrest in an interior of the vehicle and configured to generate, from the noise reducing signal, noise reducing sound at a listening position in the interior of the vehicle; and
   an accelerometer arrangement configured to generate an accelerometer sense signal representative of at least one of accelerations, motions, and vibrations that occur on or in a body part of the vehicle, wherein the active road noise control filter is further configured to iteratively and adaptively process the microphone sense signal and the accelerometer sense signal to provide an additional noise reducing signal to the headrest loudspeaker arrangement.

* * * * *